US009138106B2

(12) United States Patent
Walker

(10) Patent No.: US 9,138,106 B2
(45) Date of Patent: Sep. 22, 2015

(54) TWO-PIECE HANDLE DESIGN FOR PRESSURE COOKER

(75) Inventor: Shane R. Walker, Eau Claire, WI (US)

(73) Assignee: National Presto Industries, Inc., Eau Claire, WI (US)

(*) Notice: Subject to any disclaimer, the term of this patent is extended or adjusted under 35 U.S.C. 154(b) by 637 days.

(21) Appl. No.: 13/594,277

(22) Filed: Aug. 24, 2012

(65) Prior Publication Data
US 2012/0324709 A1 Dec. 27, 2012

Related U.S. Application Data

(62) Division of application No. 12/617,362, filed on Nov. 12, 2009, now Pat. No. 8,276,507.

(60) Provisional application No. 61/113,469, filed on Nov. 11, 2008.

(51) Int. Cl.
A47J 27/08 (2006.01)
A45C 13/26 (2006.01)
A47J 45/06 (2006.01)

(52) U.S. Cl.
CPC .............. *A47J 45/061* (2013.01); *A47J 27/08* (2013.01); *Y10T 16/44* (2015.01); *Y10T 16/4559* (2015.01); *Y10T 16/4707* (2015.01); *Y10T 29/49947* (2015.01)

(58) Field of Classification Search
CPC ... A47J 36/06; A47J 2043/0738; A47J 27/08; A47J 45/071; Y10T 16/4559; Y10T 16/469
USPC ............... 219/440; 99/337, 403; 16/406, 422; 53/257, 235
See application file for complete search history.

(56) References Cited

U.S. PATENT DOCUMENTS

| 2,217,369 | A | | 10/1940 | Jacobsen et al. | |
| 2,357,634 | A | * | 9/1944 | Crites | 219/440 |
| 2,424,125 | A | | 7/1947 | Sieling | |
| 2,595,361 | A | | 5/1952 | Keating | |
| 3,108,316 | A | | 10/1963 | Peale | |
| 4,103,801 | A | | 8/1978 | Walker | |

(Continued)

OTHER PUBLICATIONS

Product Bulletin, Presto® 6-Quart Electric Stainless Steel Pressure Cooker, 2009, 1 page.

(Continued)

*Primary Examiner* — Stephen F Gerrity
*Assistant Examiner* — Eyamindae Jallow
(74) *Attorney, Agent, or Firm* — Patterson Thuente Pedersen, P.A.

(57) ABSTRACT

An improved pressure cooker design including a two-piece handle utilizing a common connection point to a cover to increase resistance to damage due to over tightening of connecting screws while simultaneously allowing the use of a conventional handle size with a reduction in overall packaging size. The two-piece handle design includes a cover base portion and a cover grip portion wherein a pair of nuts are mounted within the cover base portion to receive coupling screws at both ends of the nuts for joining the cover and the cover grip portion to the cover base portion. Tightening of the coupling screws provides for continuous metal on metal contact eliminating damage to weaker polymeric materials while allowing a consumer to quickly and easily attach the cover grip portion of the two-piece handle to the cover base portion at a point of use so as reduce overall packaging dimensions.

16 Claims, 8 Drawing Sheets

(56) References Cited

U.S. PATENT DOCUMENTS

| | | | |
|---|---|---|---|
| 4,143,787 A | | 3/1979 | Walker |
| 4,162,741 A | | 7/1979 | Walker et al. |
| D253,388 S | | 11/1979 | Boldt et al. |
| D253,746 S | | 12/1979 | Boldt et al. |
| D253,867 S | | 1/1980 | Boldt et al. |
| D254,769 S | | 4/1980 | Boldt et al. |
| 4,330,069 A | * | 5/1982 | Bauer .................. 220/203.18 |
| 4,434,909 A | | 3/1984 | Ott |
| 4,512,495 A | * | 4/1985 | Bauer et al. ................ 220/316 |
| 4,794,666 A | | 1/1989 | Kim |
| 4,932,550 A | | 6/1990 | Moucha |
| 5,704,092 A | * | 1/1998 | Nicollet et al. ................ 16/425 |
| 6,000,100 A | * | 12/1999 | Montgelard .................... 16/425 |
| 6,283,014 B1 | * | 9/2001 | Ng et al. ........................ 99/330 |
| 6,439,421 B1 | * | 8/2002 | Lin ................................ 220/759 |
| 6,920,820 B2 | | 7/2005 | Meggison et al. |
| 8,267,277 B2 | * | 9/2012 | Chameroy et al. ............ 220/763 |
| 8,276,507 B1 | | 10/2012 | Walker |
| 2003/0208884 A1 | * | 11/2003 | Kahler et al. .................. 16/422 |
| 2003/0229969 A1 | * | 12/2003 | Park ................................ 16/425 |
| 2004/0068845 A1 | * | 4/2004 | Fiocco ............................ 16/422 |
| 2005/0145637 A1 | * | 7/2005 | Lin ................................ 220/759 |

OTHER PUBLICATIONS

Product Bulletin, Presto® 4-Quart Aluminum Pressure Cooker, 2009, 2 pages.
Product Bulletin, Presto® 4-Quart Stainless Steel Pressure Cooker, 2009, 2 pages.
Product Bulletin, Presto® 6-Quart Aluminum Pressure Cooker, 2009, 2 pages.
Product Bulletin, Presto® 6-Quart Stainless Steel Pressure Cooker, 2009, 2 pages.
Product Bulletin, Presto® 6-Quart Stainless Steel Pressure Cooker with Colander Cover, 2009, 2 pages.
Product Bulletin, Presto® 8-Quart Aluminum Stainless Steel Pressure Cooker, 2009, 2 pages.
Product Bulletin, Presto® 8-Quart Stainless Steel Pressure Cooker, 2009, 2 pages.
Application and File history for U.S. Appl. No. 12/617,362, filed Nov. 12, 2009. Inventor: Shane R. Walker.

\* cited by examiner

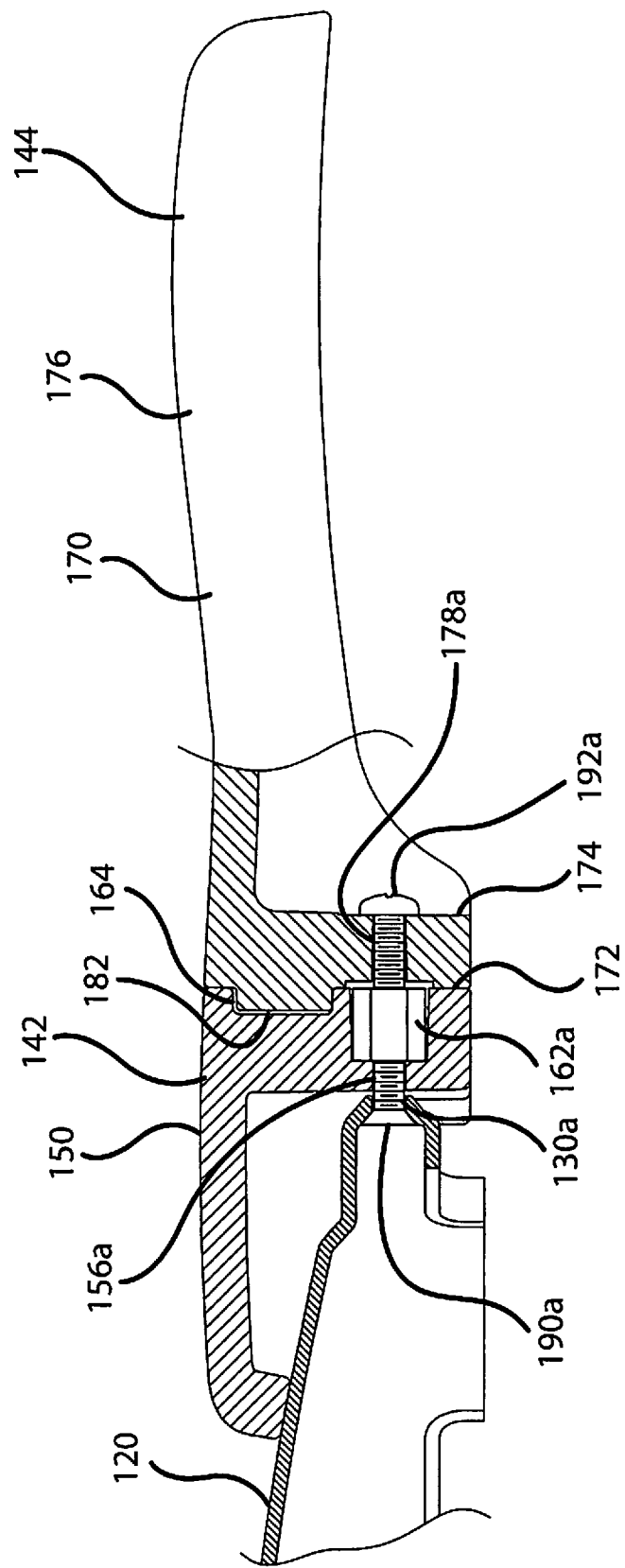

TWO-PIECE HANDLE DESIGN FOR PRESSURE COOKER

RELATED APPLICATIONS

This application is a division of application Ser. No. 12/617,362 filed Nov. 12, 2009, which claims the benefit of U.S. Provisional Application No. 61/113,469, filed Nov. 11, 2008, each of which is hereby fully incorporated herein by reference.

FIELD OF THE INVENTION

The present invention relates to the field of handle designs for consumer appliances. More specifically, the present invention is directed to a two-piece handle design sharing a common extended coupling nut to increase mounting strength while reducing overall packaging dimensions.

BACKGROUND OF THE INVENTION

Pressure cookers are well known cooking devices that allow for reduced preparation times while maintaining vitamins and minerals within the food to be cooked. Generally, a pressure cooker can include a small amount of added water and the food item to be cooked. The pressure cooker can then be sealed with a cover and placed over a heat source such as, for example, a gas or electric stove burner. The water is eventually heated to boiling wherein the steam is retained within the sealed pressure cooker. The formation and retention of the steam results in an increase to the internal pressure within the pressure cooker. Due to this increased pressure, the boiling temperature of the water increases such as, for example, to about 121° C. at 1 atmosphere. With this increased temperature, the cooking time is reduced while the surrounding steam does not leach the vitamins and minerals from the food item as can occur during traditional boiling.

SUMMARY OF THE INVENTION

The present application relates to an improved pressure cooker design including a two-piece handle design utilizing a common connection point to increase resistance to damage due to over tightening of connecting screws while simultaneously allowing the use of a conventional handle size with a corresponding reduction in overall packaging size. Generally, the two-piece handle design includes a cover base portion and a cover grip portion wherein a pair of nuts are mounted within the cover base portion to receive coupling screws at both ends of the nuts for operably joining the cover and the cover grip portion to the cover base portion. Connection of the cover base portion and the cover allows for capture of an interlock assembly that prevents the development of pressure within the pressure cooker if the cover is incorrectly attached to the pressure cooker or prevents removal of the cover from the pressure cooker when the pressure cooker is pressurized. By providing for a pair of shared nuts within the cover base portion, tightening of the coupling screws provides for continuous metal on metal contact to eliminate potential damage to weaker polymeric materials while allowing a consumer to quickly and easily attach the cover grip portion of the two-piece handle to the cover base portion at a point of use so as to not require packaging that must accommodate the attached dimensions of the cover and two-piece handle.

In one aspect, the present disclosure relates to a two-piece handle design that provides the simultaneous benefits of increased mounting strength with a reduction in overall packaging dimensions.

In another aspect, the present disclosure relates to a method for coupling a handle to a cover assembly that provides increased strength and rigidity to a fully assembled cover assembly.

In yet another aspect, the present disclosure related to a method of reducing packaging dimensions for a pressure cooker by providing a two-piece handle assembly for attachment at a point of use.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follow more particularly exemplify these embodiments.

BRIEF DESCRIPTION OF THE DRAWINGS

These as well as other objects and advantages of this invention, will be more completely understood and appreciated by referring to the following more detailed description of the presently preferred exemplary embodiments of the invention in conjunction with the accompanying drawings of which:

FIG. 8 is a partial section view of the handle assembly attached to the cover assembly.

Figure 1:
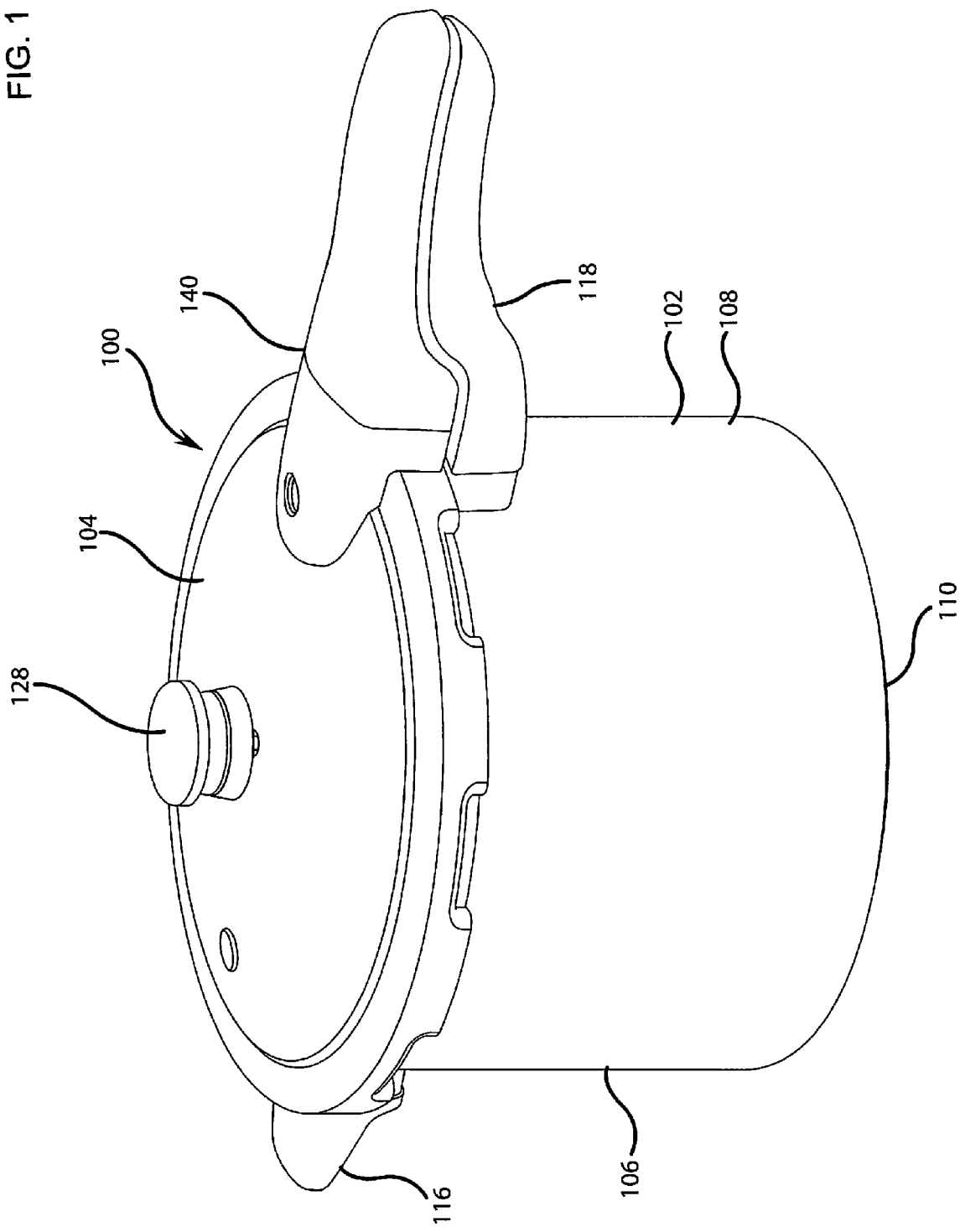
FIG. 1 is a perspective view of a pressure cooker according to an embodiment of the present invention.
Figure 2:
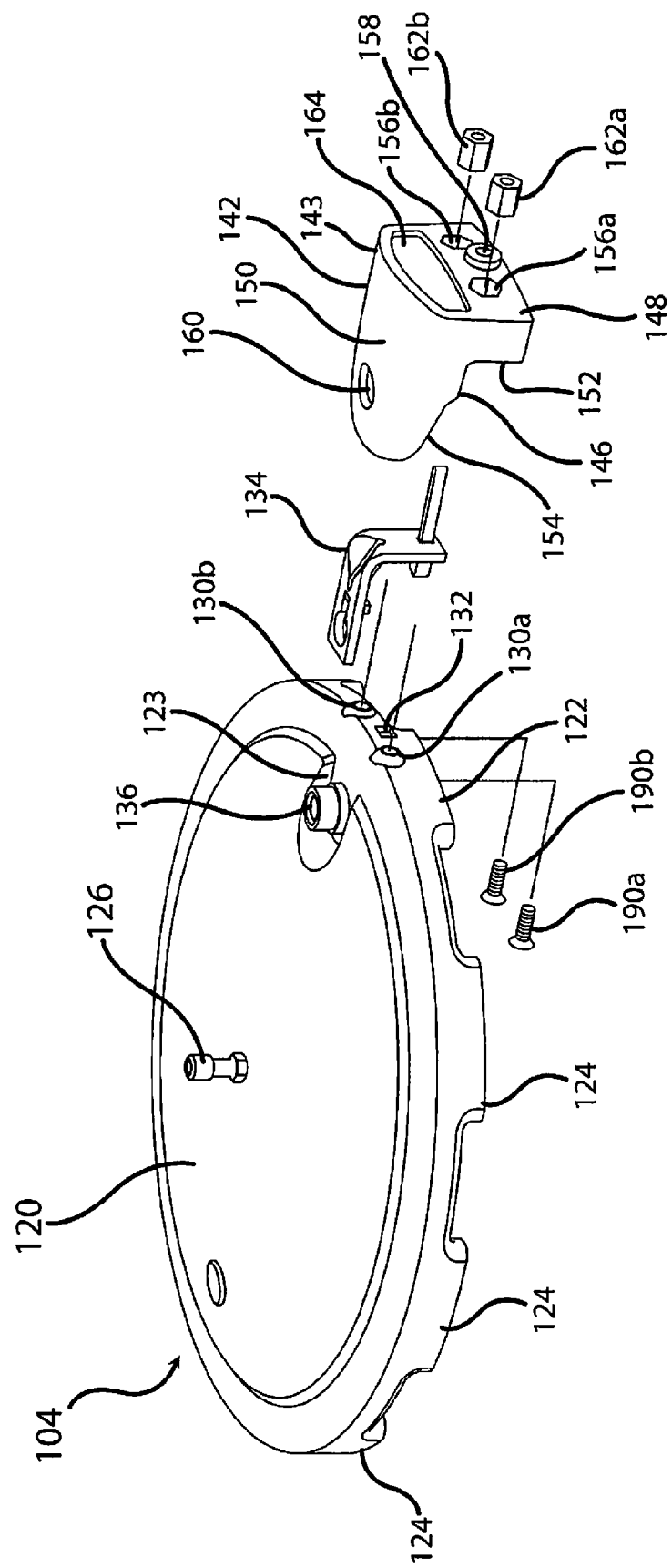
FIG. 2 is an exploded perspective view of a cover assembly according to an embodiment of the present invention.
Figure 3:
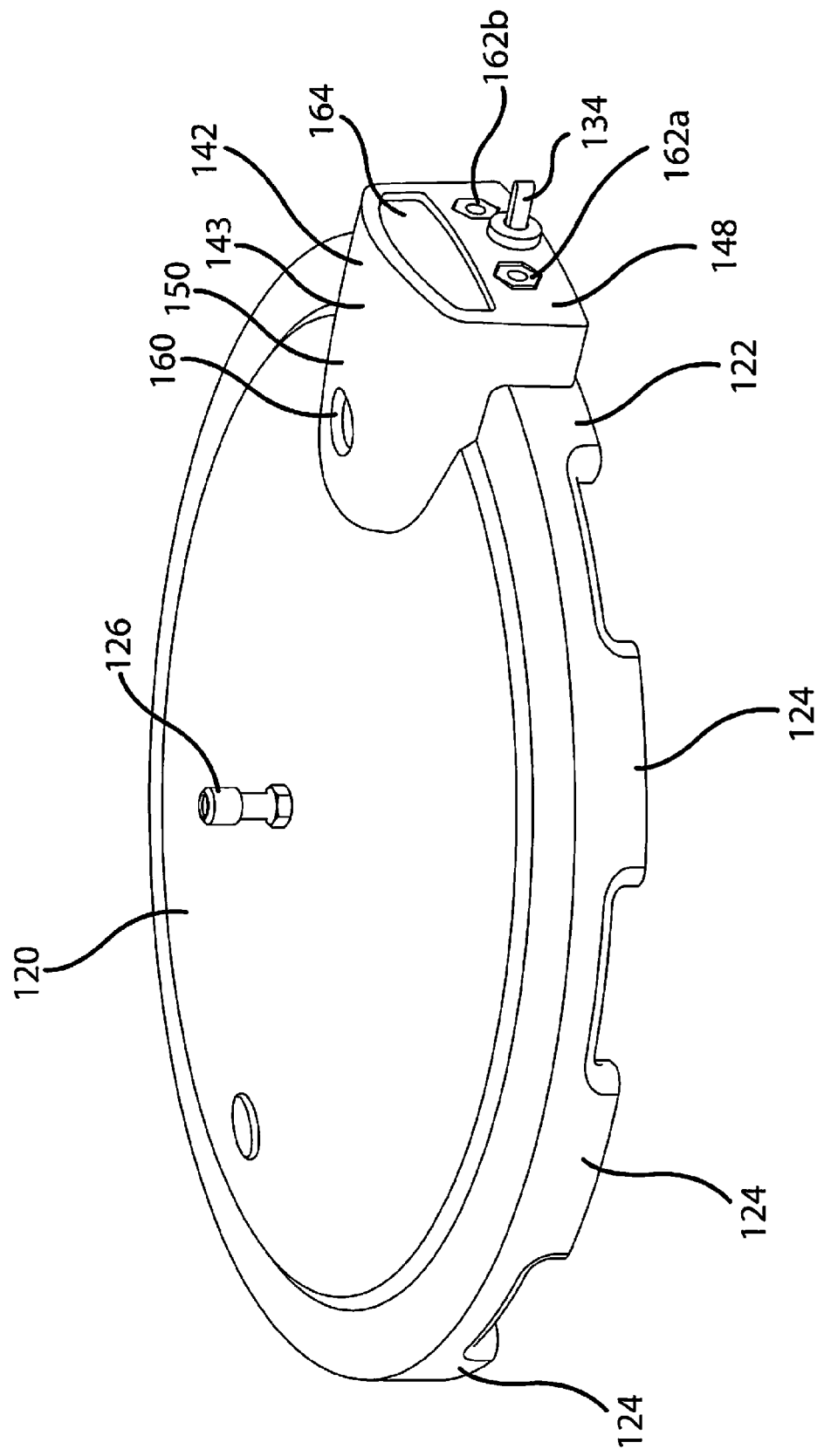
FIG. 3 is a perspective view of the cover assembly of FIG. 2.
Figure 4:
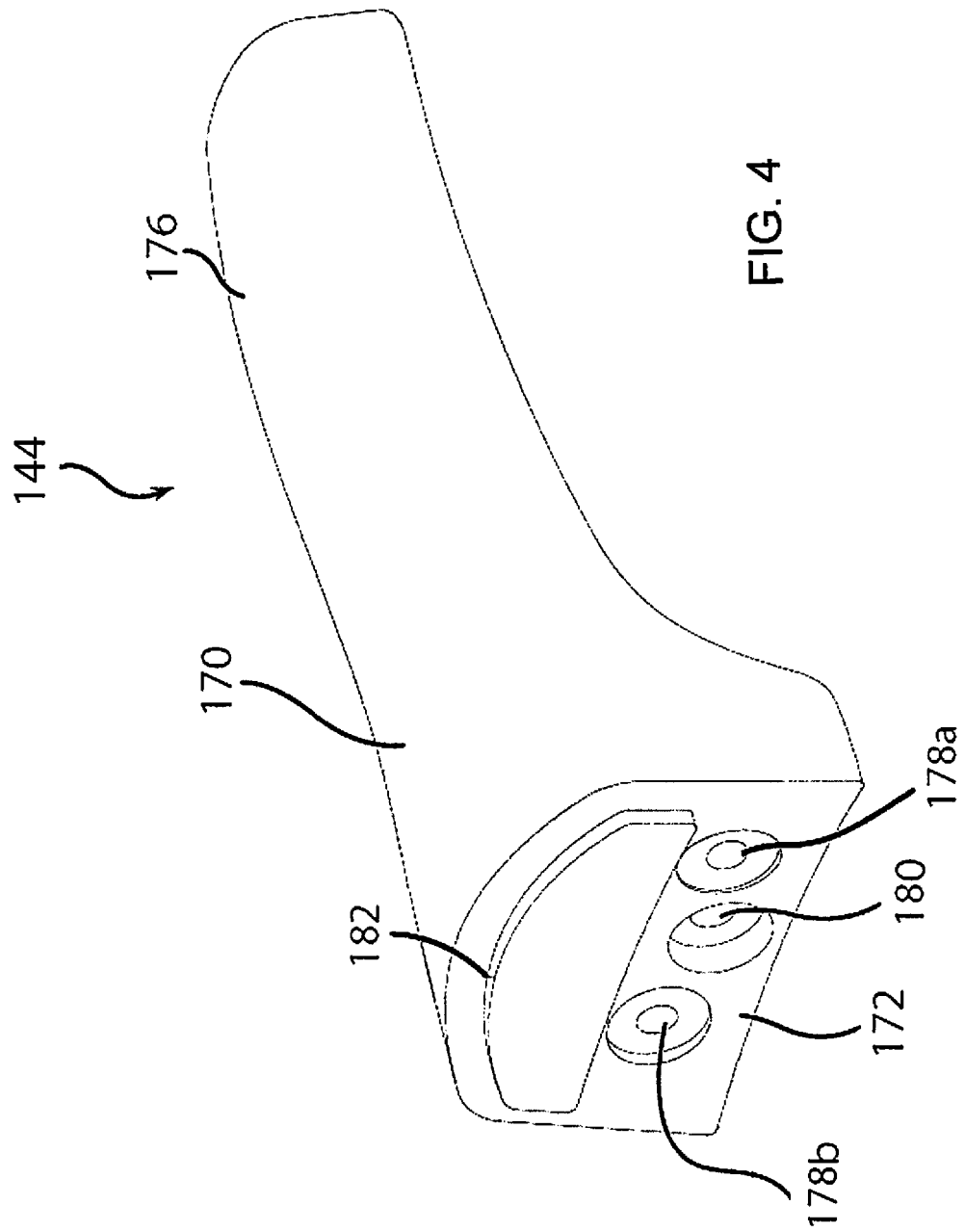
FIG. 4 is a perspective view of a grip portion of a handle assembly.
Figure 5:
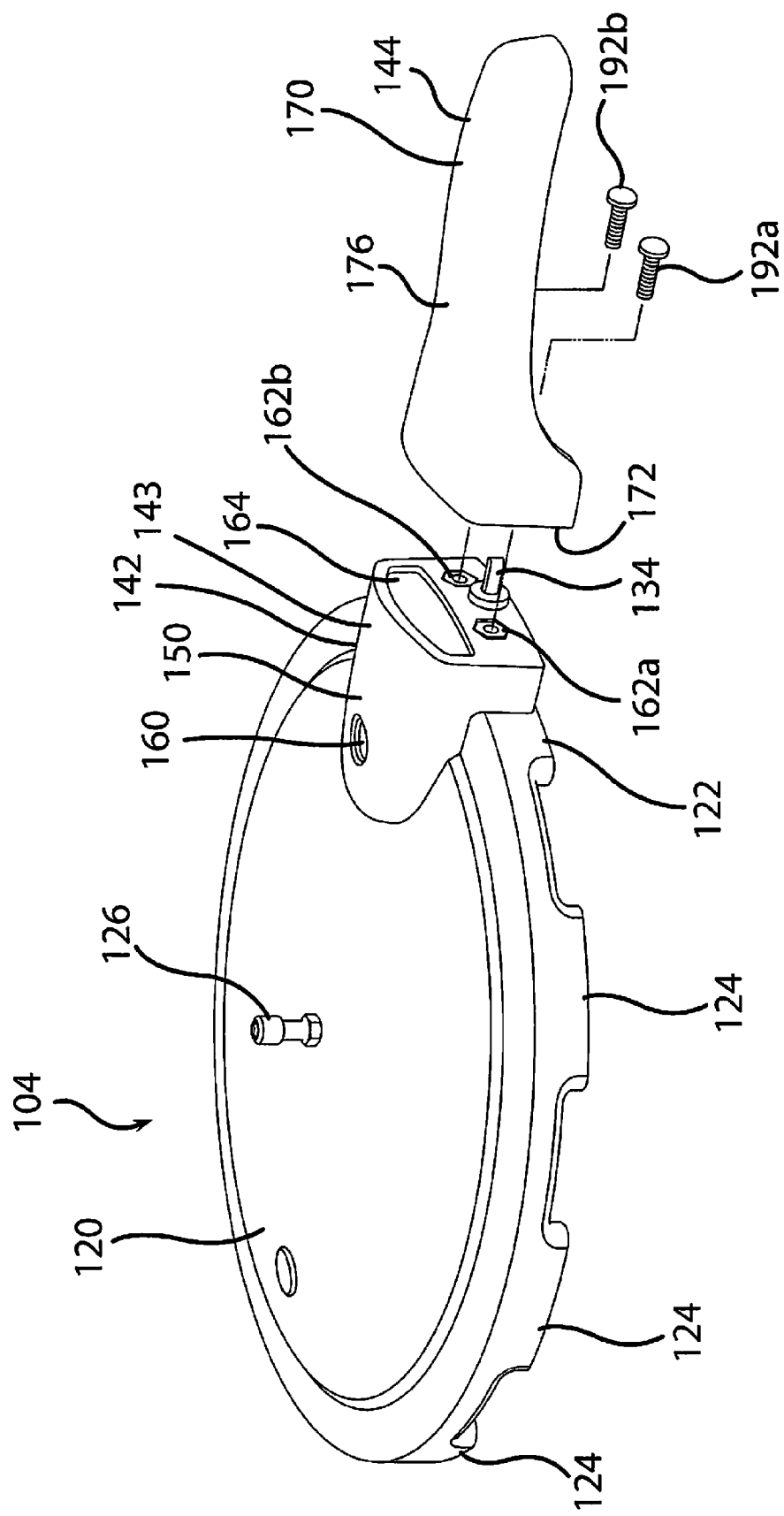
FIG. 5 is an exploded perspective view of the handle assembly according to an embodiment of the present invention prior to attachment to the cover assembly of FIG. 2.
Figure 6:
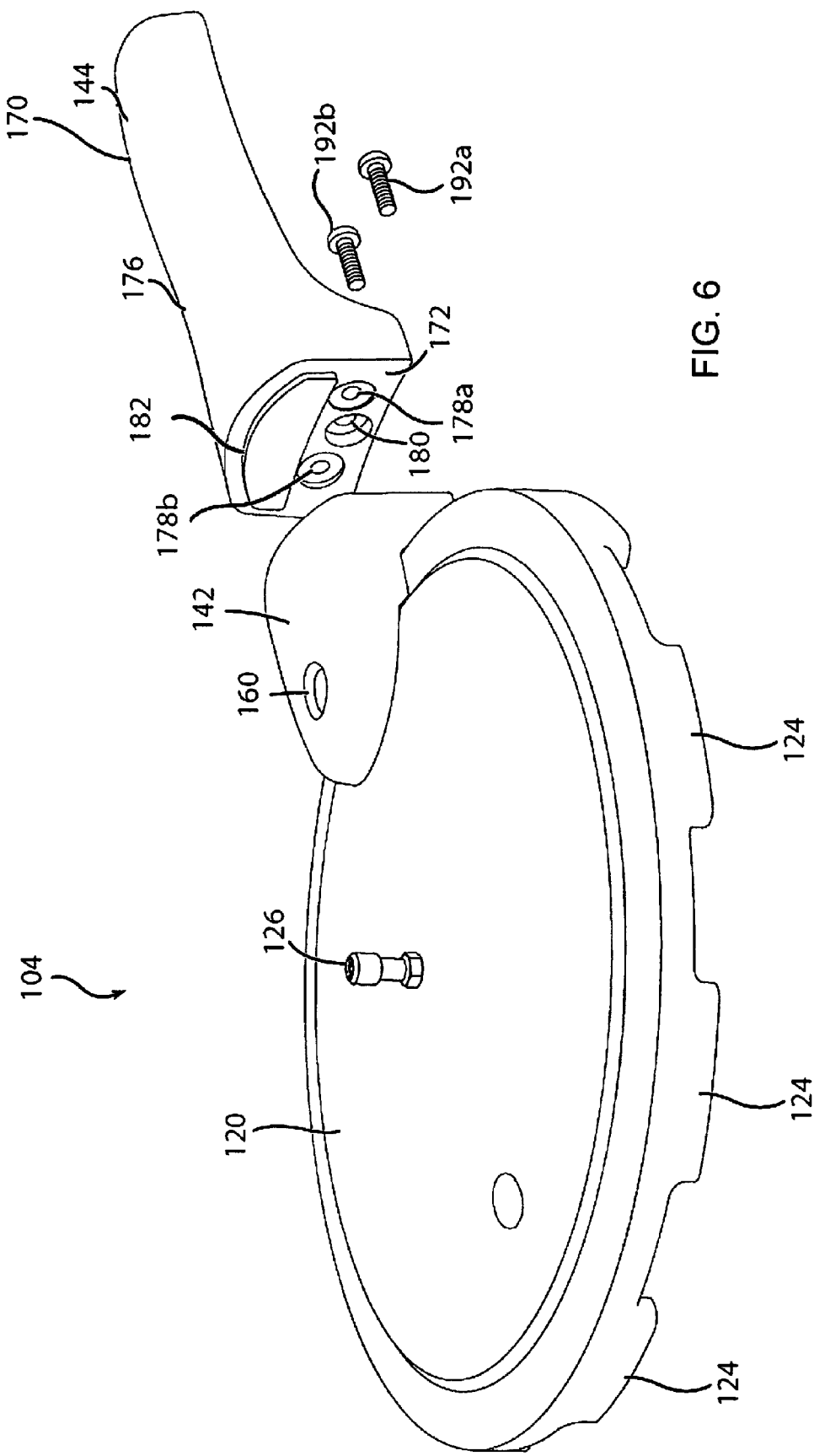
FIG. 6 is an exploded perspective view of the grip portion of the handle assembly according to an embodiment of the present invention prior to attachment to the cover assembly of FIG. 2.
Figure 7:
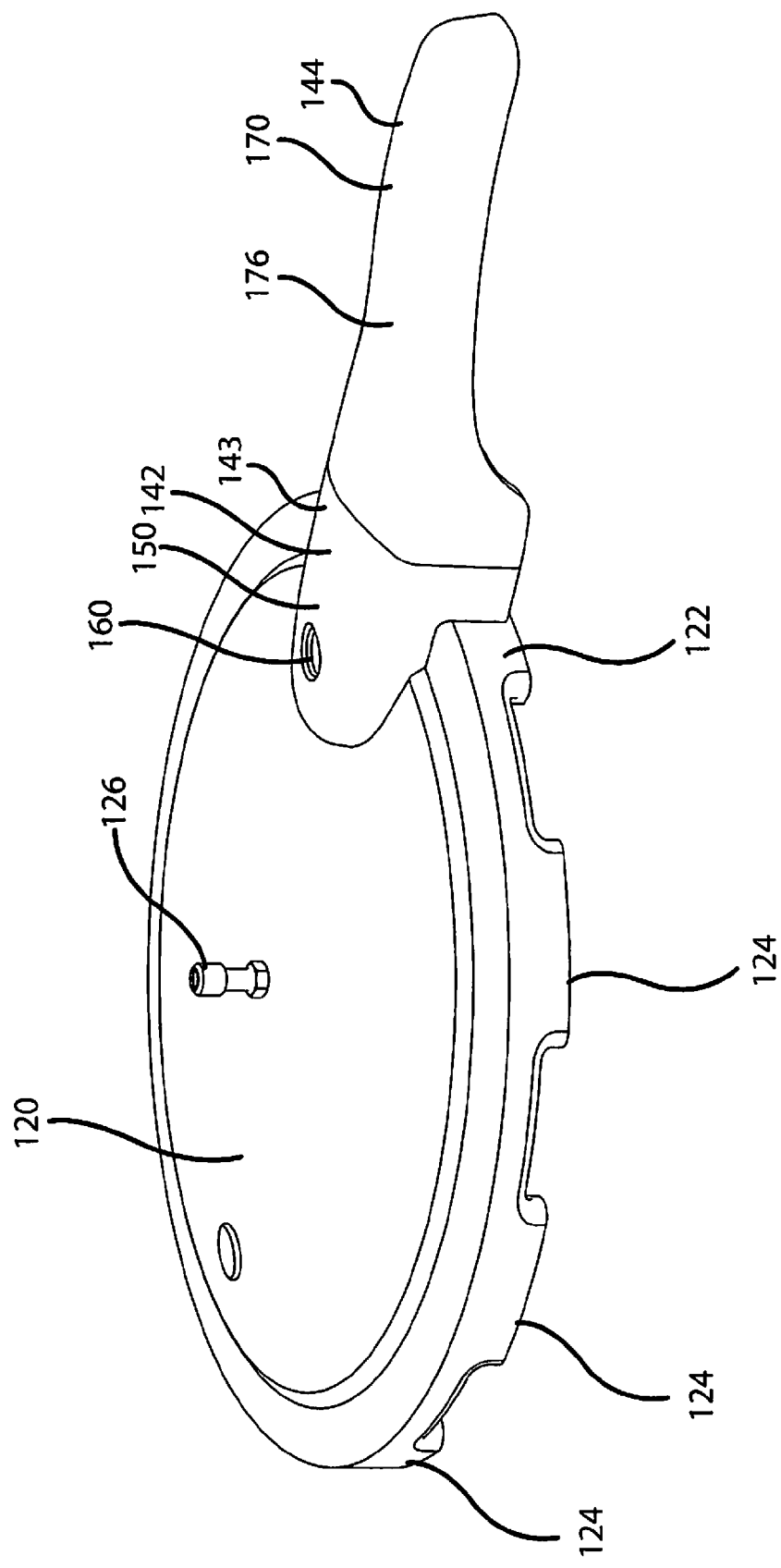
FIG. 7 is a perspective view of the handle assembly attached to the cover assembly of FIG. 2.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents and alternatives.

DETAILED DESCRIPTION OF THE DRAWINGS

As illustrated in FIG. 1, an embodiment of a pressure cooker 100 generally comprises a cooking pot 102 and a cover assembly 104. Cooking pot 102 and cover assembly 104 generally interlock to define a pressurized vessel 106 for receiving a food product for cooking under conditions above atmospheric pressure. Pressurized vessel 106 is generally designed to operate at an internal pressure of about 1 atmosphere.

Referring again to FIG. 1, cooking pot 102 generally has a perimeter surface 108 and a bottom surface 110. Cooking pot 102 is generally constructed of a material capable of withstanding up to about 1 atmosphere of pressure such as, for example, steel. Though not shown, an upper portion of the cooking pot 102 generally includes a plurality of spaced apart retention tabs. Cooking pot 102 further includes a helper handle 116 and a lower handle portion 118. Helper handle 116 and lower handle portion 118 are generally attached by a consumer following purchase so as to avoid adding to a packaging profile of cooking pot 102.

As illustrated in FIGS. 1-7, cover assembly 104 includes a cover member 120 having a perimeter surface 122, an interlock recess 123 and a plurality of spaced apart locking tabs 124. Cover member 120 includes a relief vent 126 and a relief valve 128 for venting pressure in excess of the design operation pressure of pressurized vessel 106. Perimeter surface 122 includes a pair of attachment apertures 130a, 130b and a slide bore 132. An interlock structure 134 interacts with the slide bore 132 and a pin bore 136 on cover member 120 to prevent pressurization of pressure vessel 106 if the cover assembly 104 is incorrectly attached and to prevent the removal of the cover assembly 104 when the pressure vessel is pressurized. Interlock structure 134 is more fully described and illustrated in U.S. Pat. No. 4,932,150, which is herein incorporated by reference.

Referring again to FIGS. 1-7 as well as FIG. 8, cover assembly 104 further comprises a two-piece handle assembly 140. Generally, two-piece handle assembly 140 comprises molded articles formed from a polymeric material that provide rigidity, strength and possess a low thermal conductivity. Two-piece handle assembly 140 generally comprises a cover base portion 142 and a cover grip portion 144.

Cover base portion 142 generally comprises a cover body 143 defined by a cover attachment surface 146, a grip attachment surface 148 and an upper viewable surface 150. Cover attachment surface 146 includes a flanged surface 152 and a contoured surface 154. A pair of cover portion attachment apertures 156a, 156b and a cover portion slide bore 158 continuously extends between the grip attachment surface 148 and the flanged surface 152. An interlock bore 160 extends between the upper viewable surface 150 and the contoured surface 154. Mounted within the cover portion attachment apertures 156a, 156b are a pair of hex nuts 162a, 162b. Grip attachment surface 148 further includes a shaped recess 164.

Cover grip portion 144 generally comprises a grip body 170 having an interface surface 172, an access surface 174 and a grip surface 176. Interface surface 172 is adapted to align with and engage grip attachment surface 148 such that interface surface 172 includes a pair of grip attachment apertures 178a, 178b, a grip slide bore 180 and a shaped projection 182. Grip attachment apertures 178a, 178b extend continuously from the interface surface 172 to the access surface 174.

In order to reduce overall packaging dimensions of the pressure cooker 100, two-piece handle assembly 140 is generally sent in a disassembled arrangement so as to avoid having to include packaging that accommodates the length of cover grip portion 144. Generally, cover base portion 142 is attached to the cover member 120 at the factory to as to insure correct assembly and placement of the interlock structure 134 and the hex nuts 162a, 162b. First, the interlock structure 134 is positioned so as to be received and aligned with slide bore 132 and pin bore 136. Next, the cover base portion 142 is arranged to capture and cover the interlock structure 134 by aligning the flanged surface 152 and contoured surface 154 with the perimeter surface 122 and the interlock recess 123 respectively. When arranged as such, the attachment apertures 130a, 130b and the cover portion attachment apertures 156a, 156b are aligned as well as the slide bore 132 and the cover portion slide bore 158. As such, the interlock structure 134 partially extends through the cover portion slide bore 158. In some instances, the hex nuts 162a, 162b can be permanently affixed or removably placed within the cover portion attachment apertures 156a, 156b. To fix the attachment of the cover base portion 142 to the cover member 120, a pair of machine screws 190a, 190b are inserted through the attachment apertures 130a, 130b and the cover portion attachment apertures 156a, 156b such that threads on the machine screws 190a, 190b engage the threads on the hex nuts 162a, 162b for tightening and retention of the cover base portion 142 to the cover member 120.

Following purchase, cover grip portion 144 can be attached to the cover base portion 142 by positioning the interface surface 172 proximate the grip attachment surface 148. Through insertion of the shaped projection 182 into the corresponding shaped recess 164, alignment of the cover portion attachment apertures 156a, 156b and the grip attachment apertures 178a, 178b (not shown) as well as the cover portion slide bore 158 and grip slide bore 180 is accomplished. The purchaser next inserts machine screws 192a, 192b through the grip attachment apertures 178a, 178b such that the threads on machine screws 192a, 192b engage corresponding threads on the hex nuts 162a, 162b.

Hex nuts 162a, 162b, machine screws 190a, 190b and machine screws 192a, 192b will all generally comprise the same metallic material such as, for example, steel or brass such that tightening of the machine screws 190a, 190b, 192a, 192b will not lead to stresses capable of cracking or otherwise damaging the hex nuts 162a, 162b. In this way, damage caused by over tightening or torquing will not lead to a connection failure as can occur when using connectors of differing materials, especially polymeric materials. In addition, the sharing of hex nuts 162a, 162b by machine screws 190a, 190b, 192a, 192b results in an overall reduction in the size of cover base portion 142 as the cover base portion 142 need only accommodate two hex nuts 162a, 162b as opposed to four hex nuts, one for each of machine screws 190a, 190b, 192a and 192b. By reducing the overall size of cover base portion 142, material costs are reduced and packaging dimensions are decreased.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A method for reducing packaging dimensions for a pressure cooker having a full-sized handle assembly, comprising:
    providing a pressure cooker having a cooking pot, a cover assembly and a handle assembly, the handle assembly including a base portion and a grip portion, wherein the cover assembly includes at least one cover fastener, the base portion includes at least one hex nut mounted within at least one base aperture and the grip portion includes at least one grip fastener;
    attaching the base portion to the cover assembly by inserting the at least one cover fastener through the cover assembly and into the corresponding hex nut of the base portion;
    packaging the pressure cooker with the grip portion being unattached to the base portion; and
    connecting the grip portion to the base portion at a point of use by inserting the at least one grip fastener through the grip portion and into the corresponding hex nut of the base portion.

2. The method of claim 1, wherein the step of attaching the base portion to the cover assembly, further comprises:
   directing each cover fastener through a cover aperture in the cover assembly, each cover aperture being aligned with the corresponding hex nut in the base portion.

3. The method of claim 2, wherein the step of connecting the grip portion to the base portion assembly, further comprises:
   directing each grip fastener through a grip aperture in the grip portion, the grip aperture being aligned with the corresponding hex nut in the base portion.

4. The method of claim 3, wherein the step of directing each grip fastener through a grip aperture, further comprises:
   positioning a shaped projection on the grip portion within a shaped recess on the base portion to align the grip apertures with the hex nuts.

5. The method of claim 1, wherein the step of attaching the base portion to the cover assembly, further comprises:
   capturing an interlock structure between the base portion and the cover assembly.

6. The method of claim 1, wherein the step of attaching the base portion to the cover assembly, further comprises:
   inserting an interlock structure on the cover assembly into a slide bore defined by the base portion, wherein misalignment of the interlock structure with the slide bore prevents formation of a seal between the cover assembly and the pot for pressurization of the pressure cooker.

7. The method of claim 1, wherein the step of attaching the base portion to the cover assembly, further comprises:
   aligning a pair of alignment apertures on the cover assembly with a pair of base apertures for insertion of the cover fastener into the front end of each hex nut.

8. The method of claim 1, wherein the step of attaching the base portion to the cover assembly further comprises:
   inserting a shaped projection of the grip portion into a corresponding shaped recess defined in the base portion, wherein insertion of the shaped projection into the shaped recess aligns the base portion and grip portion for joining with at least one grip fastener.

9. A method for reducing packaging dimensions for a consumer appliance, comprising:
   providing a cover assembly including a handle assembly having a base portion and a grip portion, the base portion including a hex nut mounted within each of a plurality of base apertures, the cover assembly further including a plurality of cover fasteners and the grip portion including a plurality of grip fasteners;
   attaching the base portion of the handle assembly to the cover assembly by inserting each cover fastener through the cover assembly and into the corresponding hex nut of the base portion;
   packaging the cover assembly and handle assembly with the grip portion of the handle assembly being unattached to the cover assembly; and
   connecting the grip portion to the base portion by inserting each grip fastener through the grip portion and into the corresponding hex nut of the base portion such that the handle assembly and the cover assembly define a consumer appliance.

10. The method of claim 9, wherein the step of attaching the base portion to the cover assembly, further comprises:
    directing each cover fastener through a cover aperture in the cover assembly, the cover aperture being aligned with the corresponding hex nut in the base portion.

11. The method of claim 10, wherein the step of attaching the grip portion to the base portion assembly further comprises:
    directing each grip fastener through a grip aperture in the grip portion, the grip aperture being aligned with the corresponding hex nut in the base portion.

12. The method of claim 11, wherein the step of directing each grip fastener through the grip aperture, further comprises:
    positioning a shaped projection on the grip portion within a shaped recess on the base portion to align the grip aperture with the corresponding hex nut in the base portion.

13. The method of claim 9, wherein the step of attaching the base portion to the cover assembly, further comprises:
    capturing an interlock structure between the base portion and the cover assembly.

14. The method of claim 9, wherein the step of attaching the base portion to the cover assembly, further comprises:
    inserting an interlock structure on the cover assembly into a slide bore defined by the base portion, wherein insertion of the interlock structure into the slide bore aligns the base portion with cover assembly.

15. The method of claim 9, wherein the step of connecting the grip portion to the cover assembly, further comprises:
    inserting a shaped projection of the grip portion into a corresponding shaped recess defined in the base portion, wherein insertion of the shaped projection into the shaped recess aligns the base portion and grip portion for joining with the grip fasteners.

16. The method of claim 9, wherein the consumer appliance is a pressure cooker.

\* \* \* \* \*